United States Patent

[11] 3,593,739

| [72] | Inventor | Ovill X. Mercier<br>737 North Minnesota Ave., Hastings, Nebr. 68901 |
|---|---|---|
| [21] | Appl. No. | 880,636 |
| [22] | Filed | Nov. 28, 1969 |
| [45] | Patented | July 20, 1971 |

[54] SPRINKLER REGULATOR VALVE AND GUARD THEREFOR
10 Claims, 5 Drawing Figs.

| [52] | U.S. Cl. | 137/377 |
|---|---|---|
| [51] | Int. Cl. | F16k 35/00 |
| [50] | Field of Search | 137/377, 378, 382 |

[56] References Cited
UNITED STATES PATENTS

| 1,585,332 | 5/1926 | Eickman | 137/382 |
|---|---|---|---|
| 2,886,055 | 5/1959 | Davis | 137/382 |
| 3,258,026 | 6/1966 | Weaver | 137/382 |
| 3,998,388 | 1/1967 | Purtell | 137/382 |

*Primary Examiner*—Henry T. Klinksiek
*Attorneys*—Clarence A. O'Brien and Harvey B. Jacobson ABSTRACT: A rigid connecting-pipe section for connection between adjacent irrigation hose ends and including a flow control valve having a laterally outwardly projecting actuating stem. The outer end of the stem is provided with an operating handle and an outwardly convex arcuate plate extends lengthwise along the connecting pipe section with the valve stem passing through the plate centrally intermediate its opposite ends. The opposite ends of the plate are secured to the corresponding ends of the connecting pipe section and the width of the plate at the operating handle for the stem is such that the plate projects outwardly from opposite sides of the handle. Further, the opposite longitudinal edges of the plate are arcuate and outwardly convex so as to reduce the possibility of the guard plate catching on ground-supported objects as the irrigation hoses and rigid connecting pipe section are dragged along the ground.

PATENTED JUL 20 1971

3,593,739

Ovill X. Mercier
INVENTOR

BY Clarence A. O'Brien
and Harvey B. Jacobson
Attorneys

SPRINKLER REGULATOR VALVE AND GUARD THEREFOR

The connecting pipe section with its flow control valve and guard plate have been designed to provide a means whereby the flow of water through adjacent irrigation hose sections may be controlled through the use of a flow control valve whose operating stem and handle thereon are guarded against catching on or damage from ground-supported objects as the irrigation hoses and connecting pipe section are dragged along the ground from one location to another.

When setting out a plurality of hose lines leading from a single source of water or a single hose line having a plurality of sprinkler heads spaced longitudinally therealong it is sometimes desirable to provide means whereby water flow through various portions of the hose line or lines may be controlled. While the controlling of water flow through hose lines may be readily accomplished by the utilization of flow-controlling valve assemblies spaded along the line, the presence of such valve assemblies and their operating stems may cause the irrigation line or lines to resist being freely dragged over the ground because of interference between the valve or valve stems with ground-supported objects.

It is accordingly the main object of this invention to provide a rigid and valved connecting pipe section for connection between adjacent irrigation hose ends and which includes a guard specifically designed whereby the valve and the stem of the valve will be guarded against contact with ground-supported objects.

Another object of this invention is to provide a connecting pipe section of the valved type and a guard plate therefore in accordance with the immediately preceding object and constructed in a manner whereby the various components of the connecting pipe section and its valve assembly may be readily assembled and the associated guard plate may be readily mounted on or removed from the assembled connecting pipe section.

A still further object of this invention is to provide a valved connecting pipe section and a guard therefore that may be readily modified for use in substantially any irrigation hose line.

A final object of this invention to be specifically enumerated herein is to provide a device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
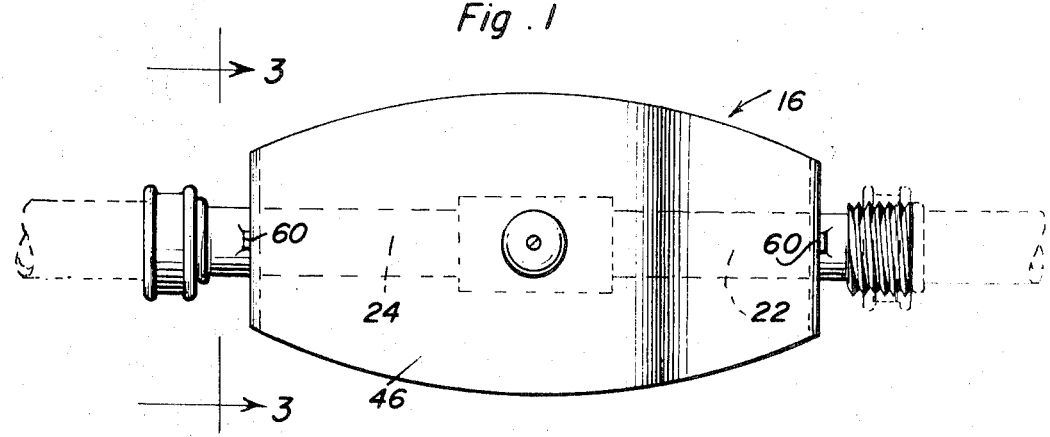
FIG. 1 is a top plan view of the valved connecting pipe section of the instant invention with the guard plate therefore mounted thereon.
Figure 2:
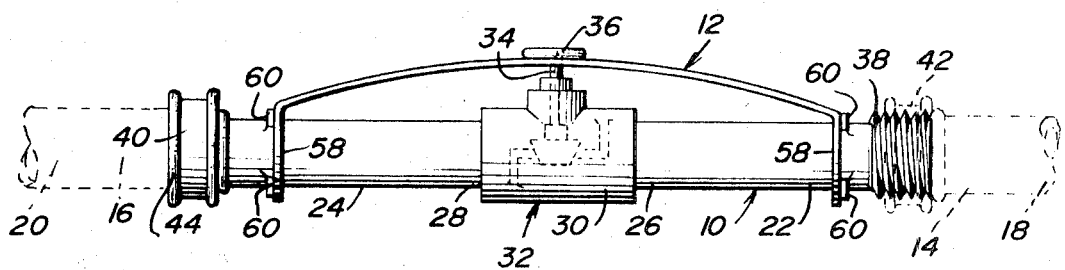
FIG. 2 is a side elevational view of the assemblage illustrated in FIG. 1.
Figure 3:
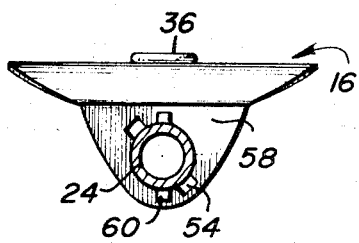
FIG. 3 is a vertical sectional view taken substantially upon the plane indicated by the section line 3-3 of FIG. 1.
Figure 4:
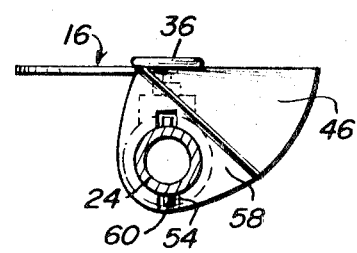
FIG. 4 is a sectional view similar to FIG. 3 but illustrating the manner in which the end of the guard plate in the foreground may be rotated about the longitudinal axis of the connecting pipe section in order to facilitate removal of the guard plate.

Referring now more specifically to the drawings the numeral 10 generally designates the valved connecting pipe section of the instant invention which may best be seen in FIG. 2 of the drawings and which has a resilient guard plate referred to in general by the reference numeral 12 operatively associated therewith.

The pipe section 10 is illustrated as connecting the adjacent ends 14 and 16 of a pair of irrigation hose sections 18 and 20, respectively.

The connecting pipe section 10 includes a pair of opposite end pipe elements 22 and 24 including adjacent ends which are removably threadedly engaged in the opposite ends of the body 30 of a control valve assembly referred to in general by the reference numeral 32. The control valve assembly 32 includes a rotatable laterally outwardly projecting operating stem 34 having a circular operating handle or wheel 36 removably fastened to its outer end. The control valve assembly is of conventional design in that the valve assembly 32 may be opened by rotating the handle or wheel 36 in a counterclockwise direction and closed by rotation of the handle or wheel 36 in a clockwise direction.

The end of the pipe element 22 remote from the body 30 is externally threaded as at 38 and the end of the pipe element 24 remote from the body 30 is internally threaded as at 40. Accordingly, the female coupling member 42 on the hose section 18 may be threaded over the external threads 38 and the male external threads 44 of the hose section 20 may be threaded into the internally threaded end of the pipe element 24 remote from the body 30.

It will be noted that the remote ends of the pipe elements 22 and 24 comprise diametrically reduced end portions or at least are no greater in diameter than the central portions of the pipe ends 22 and 24.

Figure 5:
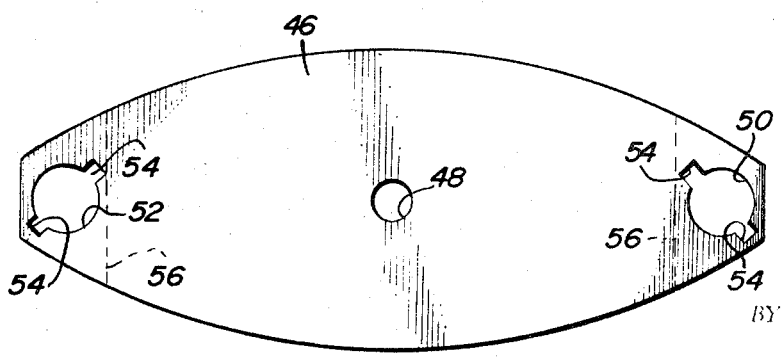
FIG. 5 is a plan view of the sheet metal blank from which the guard plate may be formed.

With attention now invited more specifically to FIG. 5 of the drawings there will be seen a blank 46 from which the guard plate 12 may be constructed. The blank 46 is elongated and includes a central opening 48 as well as opposite end openings 50 and 52. The openings 50 and 52 each includes diametrically opposite radial extensions 54 and the blank 46 additionally includes a pair of bend lines 56 along which the opposite terminal ends of the blank 46 are bent at right angles to the same side of the blank 46 in order to define end flanges 58 of the guard plate 12.

The remote end portions of the pipe elements 22 and 24 each include diametrically opposite radially outwardly projecting ears 60 and the remote end portions of the pipe elements 22 and 24 are slidably and rotatably received through the openings 50 and 52. Further, the ears 60 are receivable through the extensions 54 when the flanges 58 are rotated in order to align the extensions 54 with the ears 60.

When it is desired to mount the guard plate 12 on the connecting pipe section 10, one end of one of the pipe ends 22 and 24 is first inserted through the corresponding end opening in the guard plate 12. Then, the guard plate and pipe section 10 may be relatively rotated so as to align the extensions 54 with the ears 60 so that the end flange through which the pipe section extends may be passed by the adjacent ear 60 and toward the control valve assembly. Thereafter, with the guard plate 12 shifted toward the other end of the pipe section 10 sufficiently to place the remote end flange of the guard plate 12 beyond the remote end of the section 10, the remote end of the pipe section 10 may be shifted through the end opening formed in the other end of the guard plate 12 and the corresponding extensions 54 and ears 60 may be registered so as to receive the latter through the former. Then, with the guard plate 12 centered on the connecting pipe section 10, the guard plate 12 may be rotated so as to align the opening 58 with the outer end of the operating stem 34. Then, the ends of the guard plate 12 are urged together so as to bow the portion of the guard plate 12 extending between the end flanges thereof whereby the opening 48 may be registered with the outer end of the stem 34 after which the center portion of the guard plate 12 is inwardly deflected so as to receive the outer end of the stem 34 through the opening 48. Then, the operating handle or wheel 36 may be secured to the outer end of the stem 34.

The longitudinal edge portions of the guard plate 12 extending between the end flanges 58 thereof are arcuate and outwardly convex and it is to be noted that the guard plate 12 may be constructed of any suitable stiff but resilient plate material having noncorrosive properties.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. An elongated connecting pipe section for connecting adjacent irrigation hose line ends, said pipe section including opposite end pipe elements and a flow control valve assembly disposed between and connecting adjacent ends of said pipe elements, said control valve including a rotatable actuating stem projecting laterally outwardly to one side of said pipe section and having an enlarged handle secured to its outer end, and an elongated protective shield plate for said stem and handle, said shield plate extending lengthwise of said pipe section outwardly of said one side thereof and including opposite end portions supported from the corresponding end portions of said pipe section, said plate being disposed generally normal to said stem and having an opening formed therethrough through which said stem projects, said enlarged handle being secured to said stem outwardly of said plate.

2. The combination of claim 1 wherein said plate is of a width greater than twice the maximum extent said handle projects outwardly of the axis of rotation of said stem.

3. The combination of claim 2 wherein said opening is formed generally centrally intermediate the opposite side marginal edge portions of said plate.

4. The combination of claim 1 wherein the opposite side edge portions of said plate are arcuate and outwardly convex.

5. The combination of claim 1 wherein the opposite end portions of said plate include generally right-angled flange portions projecting inwardly toward and through which the opposite end portions of said pipe section extend.

6. The combination of claim 1 wherein said plate is arcuate and outwardly convex.

7. The combination of claim 6 wherein the opposite side edge portions of said plate are arcuate and outwardly convex.

8. The combination of claim 7 wherein said plate is of a width greater than twice the maximum extent said handle projects outwardly of the axis of rotation of said stem.

9. The combination of claim 8 wherein said opening is formed generally centrally intermediate the opposite side marginal edge portions of said plate.

10. The combination of claim 1 wherein the opposite end portions of said plate include generally right-angled flange portions projecting inwardly toward and through which the opposite end portions of said pipe section extend, said plate being constructed of stiff but resilient material, said flange portions having openings formed therein through which said opposite end portions are rotatably received, said openings and end portions including radial extensions and projections, respectively, disposed out of registry with each other, said extensions being registrable with said projections upon flexure of the end portions of said plate angularly displacing said end portions from their unflexed positions when said stem is received through said opening.